(12) United States Patent
Seth et al.

(10) Patent No.: US 7,550,187 B2
(45) Date of Patent: Jun. 23, 2009

(54) MOISTURE BARRIER MEMBRANE WITH TEARABLE RELEASE LINER COMPOSITE

(75) Inventors: Jyoti Seth, Andover, MA (US); John E. Abrahamson, Hampstead, MA (US); James R. Hansen, Tinley Park, IL (US); Carmen J. Melillo, Wilmington, MA (US)

(73) Assignee: W. R. Grace & Co. -Conn., Columbia, MD (US)

( * ) Notice: Subject to any disclaimer, the term of this patent is extended or adjusted under 35 U.S.C. 154(b) by 714 days.

(21) Appl. No.: 10/543,353

(22) PCT Filed: Jan. 16, 2004

(86) PCT No.: PCT/US2004/001181

§ 371 (c)(1), (2), (4) Date: Jul. 26, 2005

(87) PCT Pub. No.: WO2004/070108

PCT Pub. Date: Aug. 19, 2004

(65) Prior Publication Data

US 2006/0141191 A1  Jun. 29, 2006

(51) Int. Cl.
B32B 7/06 (2006.01)
B32B 7/12 (2006.01)

(52) U.S. Cl. .............. 428/41.8; 428/40.1; 428/202; 428/352; 428/42.2; 428/40.5; 428/114; 52/408; 52/411; 52/746.1; 52/98

(58) Field of Classification Search ............ None
See application file for complete search history.

(56) References Cited

U.S. PATENT DOCUMENTS

| 1,361,517 A | 12/1920 | Cavey | 161/406 |
| 2,005,665 A | 6/1935 | Saignier | 229/51 |
| 2,044,788 A | 6/1936 | Harshberger | 52/419 |
| 2,395,668 A | 2/1946 | Kellgren et al. | 428/40 |
| 2,508,855 A | 5/1950 | Brown | 428/43 |
| 2,771,385 A | 11/1956 | Humphner | 154/53.5 |
| 2,847,948 A | 8/1958 | Truitt | 161/145 |

(Continued)

FOREIGN PATENT DOCUMENTS

CA  861467  1/1971

(Continued)

OTHER PUBLICATIONS

PCT International Search Report (From PCT/ISA/210) for International application No. PCT/US04/01181.

*Primary Examiner*—Jennifer McNeil
*Assistant Examiner*—Nicole Harrison
(74) *Attorney, Agent, or Firm*—Stephan P. Williams; Craig K. Leon

(57) ABSTRACT

An exemplary moisture barrier membrane 10 comprises a waterproof adhesive layer, (14) a carrier support, (12) and a release liner (16) composite having a paper sheet, (20) cutting strings, (22) a polyolefin (24) coating or film for holding the strings against the paper and apart from the waterproof adhesive layer, and a release agent (26) such as silicone or wax over the polyolefin coating or film. This construction allows for relatively thin paper and strings to be used, such that tear resistance is conferred upon the release liner composite as a whole.

13 Claims, 2 Drawing Sheets

U.S. PATENT DOCUMENTS

| | | | |
|---|---|---|---|
| 2,884,126 A | 4/1959 | Ulrich | 428/480 |
| 2,976,256 A | 3/1961 | Whittier et al. | 161/237 |
| 3,034,941 A | 5/1962 | Hessenthaler | 428/42.1 |
| 3,252,851 A | 5/1966 | Benson | 161/236 |
| 3,290,206 A | 12/1966 | Johnson et al. | 161/406 |
| 3,292,334 A | 12/1966 | Craig | 161/146 |
| 3,467,250 A | 9/1969 | D'Elia et al. | 428/43 |
| 3,486,964 A | 12/1969 | Brunlid | 161/145 |
| 3,741,856 A | 6/1973 | Hurst | 428/542.8 |
| 3,770,559 A | 11/1973 | Jackson | 161/89 |
| 3,873,018 A | 3/1975 | Donnay | 428/43 |
| 3,900,102 A * | 8/1975 | Hurst | 206/411 |
| 4,091,135 A | 5/1978 | Tajima et al. | 428/40 |
| 4,172,830 A | 10/1979 | Rosenberg et al. | 428/245 |
| 4,221,628 A | 9/1980 | Rosenberg et al. | |
| 4,301,204 A | 11/1981 | McCusker et al. | 428/110 |
| 4,315,392 A | 2/1982 | Sylvest | 52/309.1 |
| 4,368,228 A | 1/1983 | Gorgati | 428/110 |
| 4,379,114 A | 4/1983 | Fujiki et al. | 428/57 |
| 4,396,665 A | 8/1983 | Rowe | 428/148 |
| 4,421,807 A | 12/1983 | Clausing et al. | 428/41 |
| 4,442,148 A | 4/1984 | Stierli | 428/40 |
| 4,751,122 A | 6/1988 | May | 428/41 |
| 5,390,458 A * | 2/1995 | Menchetti | 52/417 |
| 5,916,654 A * | 6/1999 | Phillips et al. | 428/42.2 |
| 6,110,552 A * | 8/2000 | Casey et al. | 428/40.1 |
| 6,235,365 B1 * | 5/2001 | Schaughency et al. | 428/40.1 |
| 6,701,685 B2 | 3/2004 | Rippey | 52/408 |
| 6,929,844 B2 * | 8/2005 | Orten et al. | 428/172 |
| 6,935,080 B2 * | 8/2005 | Allwein et al. | 52/404.1 |

FOREIGN PATENT DOCUMENTS

| | | |
|---|---|---|
| WO | WO-89/03765 | 5/1989 |

* cited by examiner

MOISTURE BARRIER MEMBRANE WITH TEARABLE RELEASE LINER COMPOSITE

FIELD OF THE INVENTION

The present invention relates to a moisture barrier membrane comprising a waterproof adhesive, carrier support, and a release liner composite having a paper sheet and paper cutting strings separated from the waterproof adhesive by a polyolefin coating or film bonded to the paper sheet. The use of one or more polyolefin coatings to bond against the paper sheet facilitates the use of thinner (i.e., lower basis weight) paper and minimizes costs and environmental waste.

BACKGROUND OF THE INVENTION

Membranes having a waterproofing adhesive and carrier support sheet are known. Such laminates typically have a release sheet for protecting the adhesive. The release sheet is often made of waxed or siliconized paper that is removed from the waterproofing adhesive before the membrane is attached to a building or other construction surface.

In U.S. Pat. No. 6,235,365 of Schaughency et al., a waterproofing membrane was disclosed having a preformed waterproofing adhesive layer, releasable sheet liner, and a string or plurality of strings operative to cut the release sheet liner into smaller portions for selective removal of the liner, such that portions of the adhesive layer could be exposed for installation onto a building surface or civil engineering surface.

Schaughency also disclosed that these "cutting" strings provided convenience and flexibility in applying waterproofing membranes to detail areas (e.g., non-flat surfaces) and also to areas around doors, windows, and other discontinuities in the building surface or other civil engineering surface (col. 2, lines 13-18). Examples of suitable strings include fishing line (e.g., 10-25 pound line) and dental floss string, and examples of string material include nylon, metal, cotton, hemp, glass, or other material, depending on the nature of release sheet liner used. The string could optionally be coated with wax, silicone, or other friction-reducing material to facilitate removal or peeling from the waterproofing adhesive (col. 3, 11. 40-51).

Schaughency et al. further disclosed that the string or strings are positioned within the membrane between the carrier support layer and the release sheet liner, either entirely or partially embedded within the waterproofing adhesive layer (col. 2, 11. 28-32). As a practical matter, however, it was noted that strings initially placed "between" the adhesive layer and release liner could become partially or totally embedded in the waterproofing adhesive, due to the tendency of the adhesive to flow around the string, leading to difficulty in locating the cutting strings at the job site.

One solution proposed by Schaughency et al. was to tape the string against the release sheet liner to decrease the tendency of the string to become embedded within the adhesive layer (col. 2, 11. 14-16); and to place markings or indicia on the outer face of the release sheet liner to facilitate location by an applicator of the string within the membrane laminate at the installation site (col. 4, 11. 29-33).

However, the present inventors believe that the use of tape to secure the string against the release sheet liner presents difficulties and problems. Because the release sheet is discarded after it is removed from the membrane adhesive, the tape is undesirable because it contributes to the amount of trash accumulating at the installation site. Furthermore, it is believed that the waterproofing adhesive, which contains oil, could delaminate the tape adhesive and potentially cause the tape and string to remain stuck to the waterproofing adhesive rather than become removed with the release sheet liner.

Accordingly, novel moisture barrier membranes with novel release liner composites are needed.

SUMMARY OF THE INVENTION

The present invention provides a moisture barrier comprising a waterproofing adhesive layer having a first major side contiguous with a carrier support sheet and a second major side releasably attached to a release liner composite that is generally coextensive with the waterproofing adhesive layer. The term "coextensive" is used to refer to a situation in which the release liner composite is at least equal in width to the adhesive layer, does not extend beyond the adhesive layer width, and thus is not folded over in portions extending beyond the adhesive layer.

An exemplary release liner composite of the present invention comprises: a paper sheet; a plurality of paper cutting strings arranged in spaced apart relation and operative to cut the paper sheet when one of the strings is pulled through the paper; and a continuous polyolefin coating or film positioned between the waterproofing adhesive layer and plurality of strings. The continuous polyolefin coating or film is bonded to the paper sheet (such as by curtain coating the polyolefin onto the paper substrate), and is operative to maintain the strings in spaced apart relation adjacent the paper sheet. A release coating (e.g., silicone or wax) releasably-attaches the polyolefin coating or film with the waterproofing adhesive layer.

In further exemplary embodiments of the invention, the waterproof adhesive flows beyond or otherwise extends beyond the width of the carrier support, such that the waterproofing membrane has at least one exposed adhesive "edge-bead" when installed on a building surface. Accordingly, the side of the paper sheet that is remote from the waterproofing adhesive can be coated with a release material (e.g., silicone and/or wax) along the longitudinal margin edges of the paper to protect the exposed edge-bead adhesive when the membrane is formed into a roll.

In employing a polyolefin coating or film between the release coat and paper sheet, and coating both sides of the paper with release coating, (e.g, one side is fully coated; the other is margin coated), a thinner paper sheet and hence thinner cutting strings can be used, thereby bestowing greater economy and ecological advantages.

In still further exemplary embodiments, wherein the paper sheet also has a margin edge-release-coated side, the paper sheet may further have a polyolefin (e.g., high density polyethylene) coating or film between the paper sheet and margin release coating. Thus, in exemplary embodiments, a polyolefin coating or film can cover both major faces of the paper sheet; or the paper sheet may be coated fully on only one major face (facing towards the waterproofing adhesive) and, on the opposite major face, on only the margin edges corresponding with the waterproofing adhesive edge-beads as described above. The use of the polyolefin coating or film, in combination with the release agent coating, helps to prevent or minimize so-called "notch-failure" which refers to the phenomenon whereby stress at the paper edge of the paper sheet can propagate tearing at the edge of the sheet.

In still further exemplary moisture barriers of the invention, another exemplary release liner composite 16 can have one or more longitudinally-extending strips of polyolefin coating or film running in parallel on the same side as the margin-release-coated edges are located (see 18/18A of FIG. 1). Such polyolefin coating or film strips may correspond in location with cutting strings 22 (FIG. 1A) located on the other side of the paper sheet 20, and serve the purpose to facilitate finding and locating individual cutting strings 22 during installation as well as to minimize notch-failure in the paper sheet edges that are cut by one of the strings 22.

Accordingly, an exemplary method for installing a moisture barrier, comprises: positioning in unrolled form, onto a building or civil engineering surface, the afore-mentioned moisture barrier; and removing the release liner composite, or a portion thereof, at an angle with respect to the longitudinal direction of the positioned moisture barrier, thereby to attach the moisture barrier to the building or civil engineering surface.

Further advantages and features of the invention, along with exemplary processes for making the waterproofing membranes and release liner composite, are described in further detail hereinafter.

BRIEF DESCRIPTION OF THE DRAWINGS

In the course of the following description, reference will be made to the drawings, provided for illustrative purposes only, wherein:

FIG. 1A is an exploded diagram of a portion of the exemplary release liner composite shown in FIG. 1.

DETAILED DESCRIPTION OF PREFERRED EMBODIMENTS

The term "moisture barrier" includes sheet materials, such as felts, spunbonded materials (e.g., polypropylene), plastic and/or metal films, and the like which are customarily used in the building trade for house wrap or waterproofing. Also included are waterproofing membranes having a continuous "pre-formed" pressure-sensitive waterproof (or "waterproofing") adhesive layer that, in contrast to hot-applied mastic compositions, retains its layer shape in ambient temperatures and is operative to adhere to building surfaces (e.g., foundations, decks) and civil engineering structures (e.g., pipes, bridges, tunnels, etc.).

Figure 1:
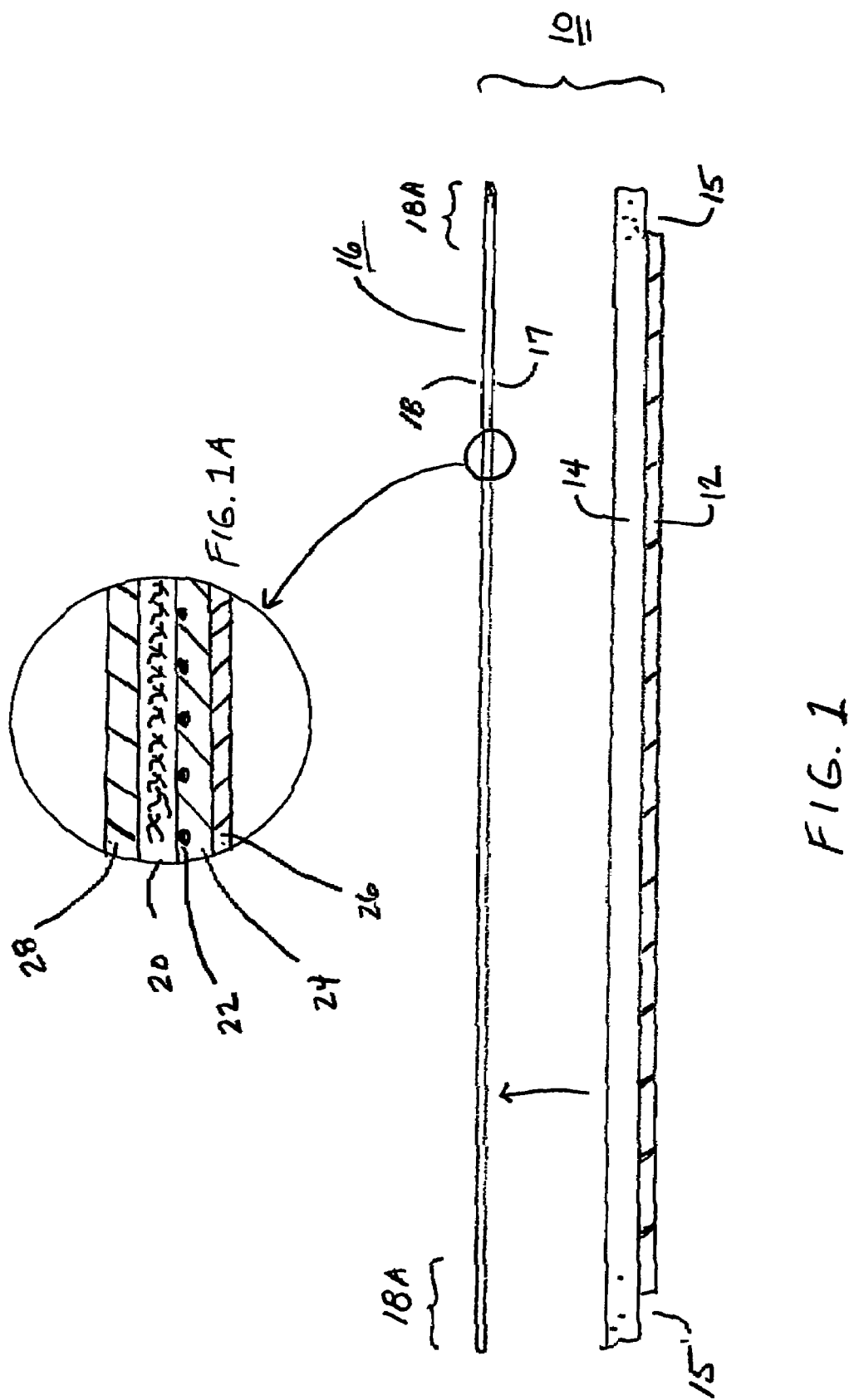
FIG. 1 is a diagram of an exemplary moisture barrier membrane of the present invention having a waterproofing adhesive layer, carrier support, and an exemplary release liner composite.

FIG. 1 is a partially exploded cross-sectional view of an exemplary moisture barrier membrane laminate 10 of the present invention comprising a carrier support 12, a waterproof and waterproofing adhesive 14, and a release liner composite 16.

Preferably, the waterproofing adhesive 14 may directly contact or be contiguous with the carrier support 12, but is preferably such that the adhesive 14 cold-flows or otherwise extends beyond the width edges of the carrier sheet 12 to provide one or more adhesive edge-beads 15 that become outwardly exposed when the membrane 10 is installed on a building surface. The purpose of the outwardly exposed adhesive surfaces 15 is to permit another waterproofing membrane adhesive to be placed onto the exposed adhesive edge-beads 15, in adhesive-to-adhesive contact. Therefore, the exemplary release liner composite 16 has a first major face 17 coated with wax or silicon to provide releasable-adhesion when contacting the waterproofing adhesive layer 14 and a second major face 18 with margin edge release-coating portions (designated by the brackets at 18A) having width sufficient to correspond with the waterproofing adhesive edge-beads 15 and being coated with wax or silicon to permit releasable-adhesion relative to the exposed adhesive edge-beads 15 when the membrane laminate 10 is rolled up on itself.

The backside of the carrier support sheet 12 (opposite the side on which is attached the waterproofing adhesive layer 14) may optionally comprise an elastomeric coating, or film (not shown) to improve skid-resistance when the carrier support sheet 12 is exposed to human foot traffic. Accordingly, exemplary moisture barrier membranes 10 of the invention optionally comprise a skid-resistant coating. Such skid-resistant coatings are employed, for example, on Ice & Water Shield® brand roofing membranes by Grace Construction Products, Cambridge, Mass. Other skid resistant coatings, such as granular (sand), may also be employed as known in the industry.

FIG. 1A is an enlarged cross-sectional view from FIG. 1 of the exemplary release liner composite 16 comprising: a paper sheet substrate 20; a plurality of strings 22 positioned against or adjacent to a first major face of the paper sheet; at least one polyolefin coating 24 or film which is bonded against said paper 20 and thus operative to secure said strings 22 against portions of the paper sheet 20 which (by virtue of the bonding with said paper) are removed from the waterproofing adhesive layer 14; and a coating of silicon 26, wax, or other material operative to permit release of the liner 16 from the waterproofing adhesive 14. Not shown in FIG. 1A are the margin edge release coating portions 18A, previously mentioned above, which would comprise a coating of wax or silicon at the edge of the release liner 16, either directly on the paper 20 or the optional polyolefin coating or film designated at 28.

Exemplary carrier supports 12, waterproofing adhesives 14, and strings 22 contemplated for use in the present invention may follow those disclosed in U.S. Pat. No. 6,235,365 of Schaughency et al., which is incorporated as if set forth fully herein.

Thus, the carrier 12 may be a continuous film made of paper, polymer, metal, glass, fabric (e.g., non-woven), felt, or mixture thereof, attached to the adhesive layer 12 and/or embedded therein. Preferably, the carrier support 12 comprises a polyolefin polymer (e.g., cross-laminated or oriented polyethylene or polypropylene). Exemplary waterproofing adhesive layers 12 may comprise bituminous materials (e.g., rubber-modified bitumen) or non-bituminous synthetic adhesive materials (e.g., SIS, SEBS, butyl rubber, etc.) as known in the art. Examples of waterproofing membranes, and methods of using and making them, are disclosed in U.S. Pat. Nos. 3,741,856 and 3,900,102 of Hurst; U.S. Pat. Nos. 4,172,830 and 4,421,623 of Rosenberg and Gaidis; U.S. Pat. No. 4,751,122 of Basil J. May; and Canadian Pat. No. 861467 of Geoffrey Davis, all of which are fully incorporated by reference herein. Rubber-modified bituminous waterproofing adhesives are herein preferred in the present invention.

Pre-formed, sheet-like waterproofing membranes having carrier support films and bituminous waterproofing adhesives are commercially available from Grace Construction Products, Cambridge, Mass., under the trade name BITUTHENE® and ICE & WATER SHIELD®.

Preferably, the strings 22 are relatively thinner in width than the thickness of the waterproofing adhesive layer 14. The strings should have individual strength to withstand being pulled through and tear the release liner composite 16 without breaking. Examples of suitable string are fishing line, such as 2-20 pound line, or dental floss string, which may optionally be coated with wax, silicone, or other friction-reducing material, to facilitate removal or peeling from the adhesive 14. The string could comprise nylon, metal, hemp, glass, or other material, depending on the nature of the release sheet liner material used. The strings 22 are preferably arranged in a parallel fashion with respect to each other, along the longitudinal or machine-direction of the release liner composite 16.

A preferred method for making moisture barrier membranes 10 of the invention comprises melt-coating the waterproofing adhesive 14 onto the silicone or wax surface 26 of the exemplary release liner composite 16 (See FIGS. 1 and 1A) which contains the plurality of cutting strings 22 prepositioned and held in a spaced-apart arrangement by the polyolefin coating or film 24 which is bonded to the paper sheet 20. After the adhesive 14 is allowed to cool, the carrier support 12 is attached to the opposite major face of the adhesive layer 14. Thus, the moisture barrier membrane 10 may be adhered to a building or construction surface, either in part by pulling one of the strings 22 through the paper sheet 20 and removing a portion of the release liner composite 16, or the release liner 16 may be removed in its entirety. In the first scenario, in which a cutting string 22 is used, the cutting string 22 is pulled through (and thus tears) the adjacent paper sheet 20, and the portion of the polyolefin coating 24 and release coating 26 layers which are bonded to the cut paper sheet 20 and are removed at the string-torn edge because they are bonded to the paper and are removed when the cut paper portion is removed.

The use of the polyolefin coating or film 24 to bond against the paper sheet 20 and to retain the cutting strings 22 in place is believed to provide superior advantages to the use of droplets, adhesive, or tape to adhere the string to the tape, or to embed the strings in the waterproofing membrane, as taught in U.S. Pat. No. 6,235,365 (See Col. 3, line 63-Col. 4, line 6). The use of the polyolefin coating or film 24 over the entire surface of the paper sheet 20 strengthens the tear resistance of the paper 20, thereby allowing thinner paper thicknesses to be used, and thus allowing thinner strings to be used, thereby reducing the amount of waste to be generated at the application site by release paper that is removed from the waterproofing adhesive 14 and discarded.

The tear resistance, tensile strength, and other physical properties of the paper will depend upon a number of factors, such as the tenacity of the releasable bond between the waterproofing adhesive and release coating. Generally, the tear strength and tensile strength should be selected such that the release liner composite 16 or selected portions thereof (e.g., as may be partially sectioned off using the cutting strings 22) can be removed without leaving substantial patches of paper (20) on the waterproofing adhesive layer 14. It is believed that the use of the margin edge release coating portions 18A (and optionally release coating strips corresponding with the location of cutting strings 22) on the back side of the release liner composite 16 will provide added resistance to notch failure (edge tearing), during pealing-removal of the release liner 16 from the waterproofing adhesive 14, such that substantial patches of paper 20 are not left on the exposed waterproofing adhesive 14 layer surface which is intended to become adhered to the target building or civil engineering surface.

The paper sheet 20 may be coated on one major face with at least one polyolefin coating 24 or film, and more preferably the paper 20 is coated on both sides with at least one polyolefin coating or film (24 and 28). The double face coating is preferred, since this is believed to enhance tear resistance of the paper on both sides of the release liner composite edge margins 18A, which are intended to be releasably-attached on both sides to the waterproofing adhesive (e.g., full face and edge-bead 15).

Exemplary paper sheets 20 suitable for use in the present invention are kraft papers having an average basis weight of 40-90 gms/m$^2$, more preferably 50-85 gms/m$^2$, and most preferably 60-80 gms/m$^2$.

Exemplary polyolefin coatings and films 24 and 28 comprise low density polyethylene, high density polyethylene, polypropylene, or a mixture thereof. High density polyethylene is preferred. The average coating or film thickness is 0.01 to 2.0 mils, more preferably 0.05 to 1.5 mils, and most preferably 0.1 to 1.25 mils. The average thickness of the polyolefin coating 24 on the major face 17 disposed against the waterproofing adhesive 14 should preferably be at least equal to, and more preferably should exceed, the average thickness of the polyolefin coating 18A of the margin edge on the other major face 18 of the paper sheet 20. Preferably, the polyolefin is melt-bonded to the paper by curtain coating a continuously moving paper substrate and nipping the coated paper between opposed rollers to ensure a uniform coating thickness. Alternatively, a polyolefin film (less than 2 mils) is laminated onto the paper using heated rollers.

Exemplary release coatings 26 and 18A on the release liner composite should have an average thickness of 0.01 to 1.5 mil, more preferably 0.05 to 1.0 mil, and most preferably 0.1 to 0.5 mil. The release coating (e.g., silicone or wax) is preferably applied by curtain coating, spraying, or other methods known.

Figure 2:
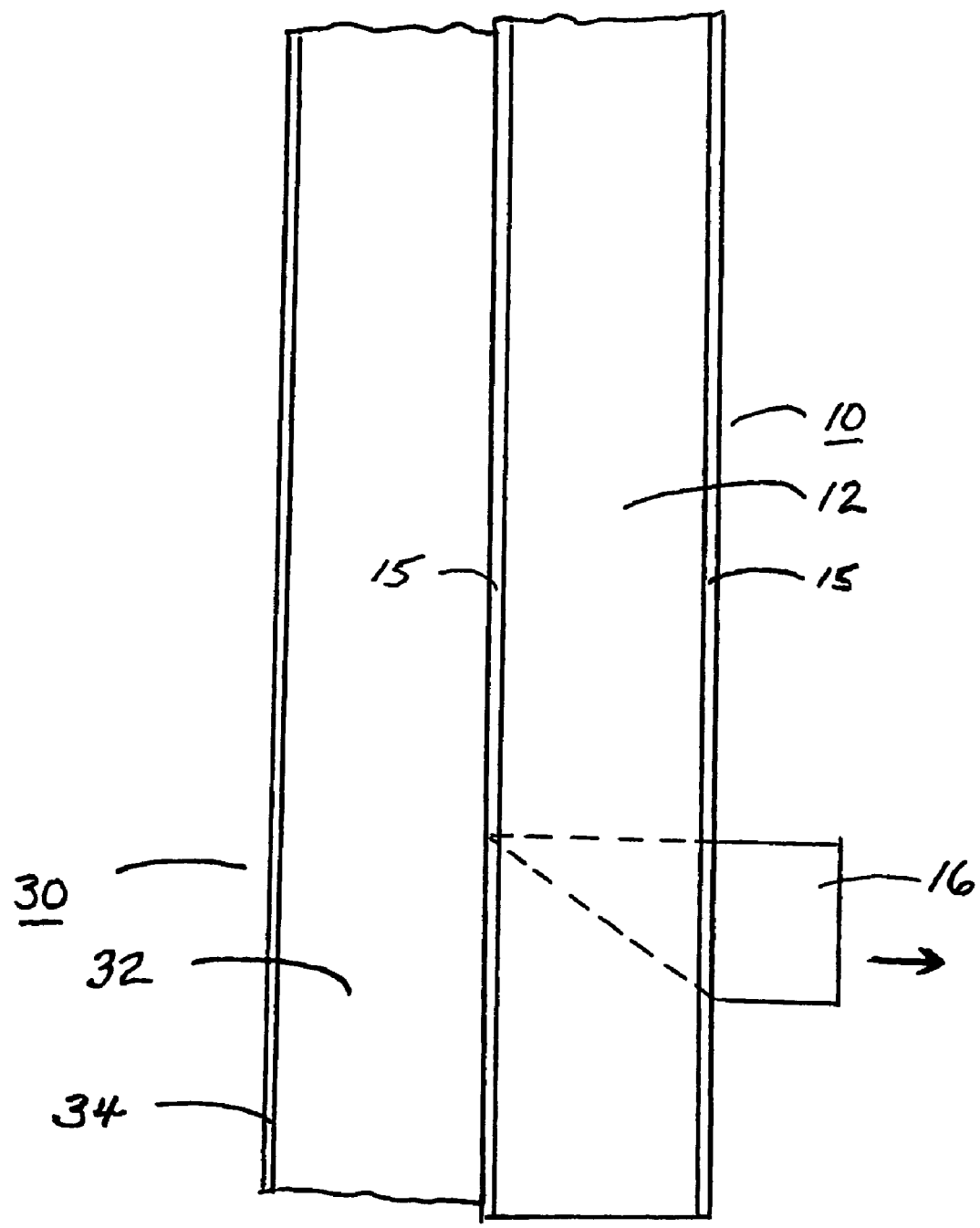
FIG. 2 is a plan diagram of an exemplary method of the invention for attaching a moisture barrier membrane.

As illustrated in FIG. 2, an exemplary method of the invention permits fast and accurate placement of exemplary moisture barrier (e.g., waterproofing) membranes of the invention. A first waterproofing membrane 30 is attached to the desired surface, with the carrier sheet 32 on top, after the release liner has been removed. The membrane has longitudinally-extending exposed edge-beads 34 and 15 of waterproofing adhesive which extend beyond, or which have cold-flowed beyond, the outermost edges of the carrier sheet 32. A second waterproofing membrane 10 can be accurately placed into overlap position onto a longitudinally-extending edge bead 15 of the prior installed membrane 30, and the release liner composite 16 can be removed by peeling motion at an angle with respect to the longitudinal direction of the membrane 10.

Accordingly, an exemplary method of the invention comprises: positioning, in unrolled form, a moisture barrier 10 onto a building (e.g., roof deck, foundation, wall, etc.) or civil engineering surface (e.g., tunnel, bridge surface, pipe, etc.), the moisture barrier 10 comprising a carrier support sheet 12, waterproofing adhesive layer 14, and a removably-attached release liner composite 16 comprising a paper sheet 20, at least one polyolefin coating or film 24 bonded to said paper sheet, and a plurality of strings 22 for cutting the paper sheet when a string is pulled through the paper sheet, said strings being contained between said paper sheet and said at least one polyolefin coating or film, and said release liner composite 16 further comprising a release agent 26 (such as silicone or wax) on the major face that is releasably-attached to the waterproofing adhesive layer and further comprising a release agent on the opposite major face of said release liner composite 16 along margins extending longitudinally along edges of the release liner composite 16; and removing a portion of, or the entirety of, the release liner composite 16, thereby to attach the moisture barrier membrane 10 to the building or civil engineering surface.

As can be seen in FIG. 2, the release liner composite 16 can be removed as a full sheet, or it can be removed in strip portions, due to the fact that it contains cutting strings as shown at 22 in FIG. 1A. In either case, the fact that the membrane 10 can be unrolled and positioned into place before removal of the release liner 16 (or any portion thereof)

provides advantages in terms of convenience and accuracy of placement, when compared to the prior art method of unrolling the membrane in the direction of release paper peel-off, as shown in U.S. Pat. No. 3,900,102 (See FIG. 4). Moreover, the use of a polyolefin coating or film to secure the cutting strings against the paper sheet allows thinner paper (and preferably thinner strings) to be used, while enhancing tear resistance of the paper-based release sheet composite 10 as a whole. Preferably, the cutting strings have an average diameter of 1-2 mils, and are preferably made of monofilament polyester and have a color (e.g., yellow) to facilitate finding the string during installation.

Thus, an exemplary moisture barrier of the invention can be positioned into place, and an edge strip of the release liner composite can be removed by pulling a string, located close to the edge, through the paper release liner. Although the string cuts through the paper, and not the underlying polyethylene coating binding the strings against the paper, nor the release agent coating (silicone) that releasably attaches the paper/polyethylene side to the waterproofing adhesive layer, an entire strip portion of the release liner composite (comprising the paper, polyethylene, and release coating) is removed due to the fact that the polyethylene is bonded to the paper and the fact that the release agent coating preferentially attaches to the (polyethylene coated side of) the paper.

Preferably, the total thickness of the release liner composite 10 is 2-7 mils, and more preferably 4-6.5 mils.

Preferably, membranes 10 of the invention have a skid-resistant coating on the back of the carrier support sheet 12 to provide some friction to foot traffic when the membrane is installed on a building surface. Any conventional skid-resistant coating may be used.

The foregoing exemplary embodiments are provided for illustrative purposes only, and are not intended to limit the scope of the invention.

We claim:

1. A moisture barrier, comprising:
   a waterproofing adhesive layer having a first major side contiguous with a carrier support sheet and having a second major side to which is releasably attached a release liner composite that is generally coextensive with and at least as wide as said waterproofing adhesive layer and is not folded along its edge, said release liner composite comprising:
   a paper sheet;
   a plurality of strings positioned against or adjacent to a major face of the paper sheet, said strings arranged in spaced apart relation to each other and operative to cut the paper sheet when one of the strings is pulled through the paper; and
   a continuous polyolefin coating or film positioned between said waterproofing adhesive layer and said plurality of strings, said continuous polyolefin coating or film being bonded with said paper sheet and operative to maintain said strings in spaced apart relation adjacent said paper sheet;
   said release liner composite further comprising a release coating positioned between said waterproofing adhesive layer and said continuous polyolefin coating or film, said release coating operative to provide releasable-adhesion between said release liner composite and said waterproofing adhesive layer; and
   said waterproofing adhesive layer being wider than said carrier support sheet, such that the membrane has exposed adhesive edge beads extending beyond at least one edge of said carrier support sheet when installed on a building surface.

2. The moisture barrier of claim 1 wherein said release liner composite, on a face remote from the waterproofing adhesive layer, is coated with a release material along the longitudinal margin edges of the release liner composite corresponding with said edge-beads of said waterproofing adhesive layer which extends beyond the edge of said carrier support sheet.

3. The moisture barrier of claim 1 wherein said paper sheet comprises strip-coatings of release material on a face of the paper sheet opposite the major face of the paper sheet on which said strings are arranged, each of said strip-coatings corresponding to the location of a cutting string situated on the opposite side of the paper sheet.

4. The moisture barrier of claim 3 wherein said strip-coatings comprise a release agent or polyolefin.

5. The moisture barrier of claim 1 wherein said paper sheet of said release liner composite has an average thickness of not less than 1 mil and not greater than 4 mils.

6. The moisture barrier of claim 5 wherein said polyolefin coating or film of said release liner composite has an average thickness not less than 0.05 mils and not greater than 1.5 mils.

7. The moisture barrier of claim 6 wherein said polyolefin coating or film is selected from the group consisting of polyethylene and polypropylene.

8. The moisture barrier of claim 7 wherein said release coating that is coated against said polyolefin coating or film of said release liner composite has an average coating thickness not less than 0.05 mil and no greater than 1.0 mil.

9. The moisture barrier of claim 8 wherein said release liner composite is coated on a side opposite said waterproofing adhesive membrane at margin edges with a release agent in an average coating thickness no less than 0.05 mil and not greater than 1.0 mil.

10. The moisture barrier of claim 1 wherein said paper sheet has an average basis weight not less than 40 gms/$m^2$ and not greater than 90 gms/$m^2$.

11. The moisture barrier of claim 1 wherein said paper sheet has an average basis weight not less than 50 gms/$m^2$ and not greater than 85 gms/$m^2$.

12. The moisture barrier of claim 1 wherein said paper sheet has an average basis weight not less than 60 gms/$m^2$ and not greater than 80 gms/$m^2$.

13. A method for installing a moisture barrier, comprising:
   positioning in unrolled form, onto a building or civil engineering surface, the moisture barrier of claim 1; and
   removing said release liner composite, or a portion thereof, at an angle with respect to the longitudinal direction of said positioned moisture barrier, thereby to attach said moisture barrier.

* * * * *